Sept. 26, 1961  G. IRWIN  3,001,461
FLASH CAMERA
Filed June 30, 1959  3 Sheets-Sheet 1

INVENTOR.
George Irwin
BY
Dams, McDougall, Williams & Hersh
Attorneys

Sept. 26, 1961  G. IRWIN  3,001,461
FLASH CAMERA
Filed June 30, 1959  3 Sheets-Sheet 2

INVENTOR.
George Irwin
BY
Ooms, McDougall, Williams & Hersh
Attorneys

Sept. 26, 1961  G. IRWIN  3,001,461
FLASH CAMERA
Filed June 30, 1959  3 Sheets-Sheet 3
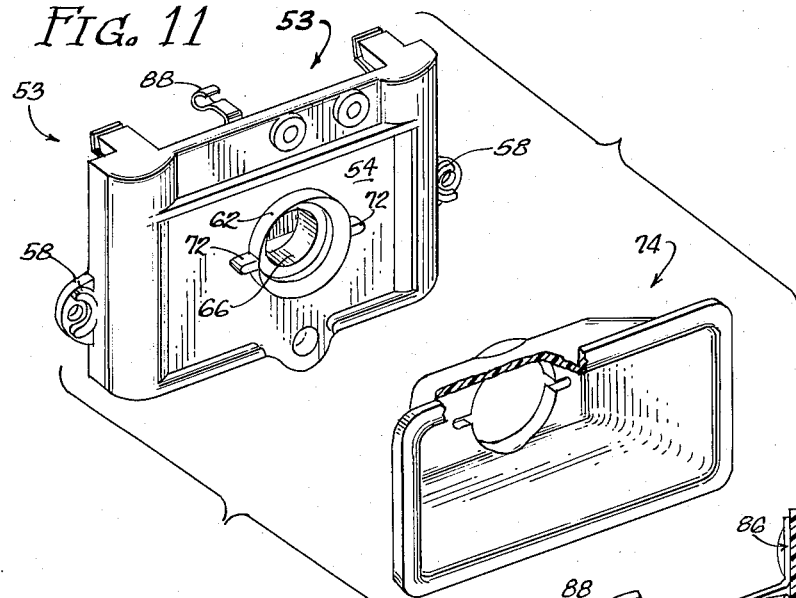
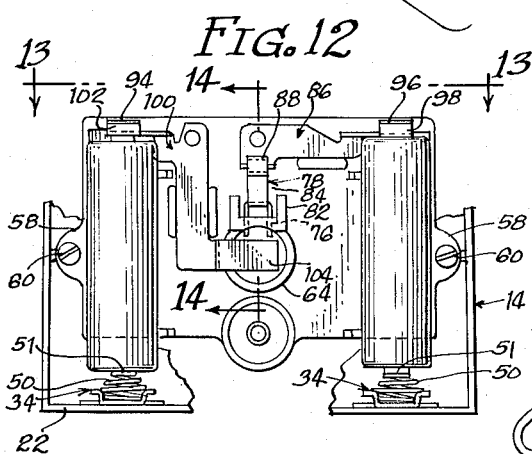
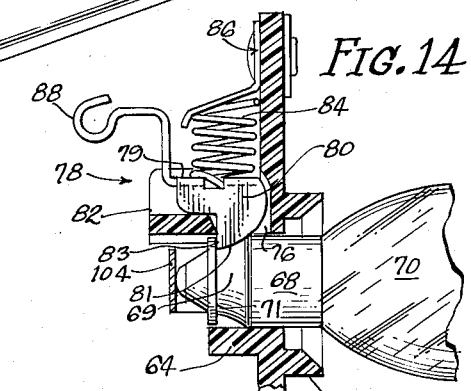
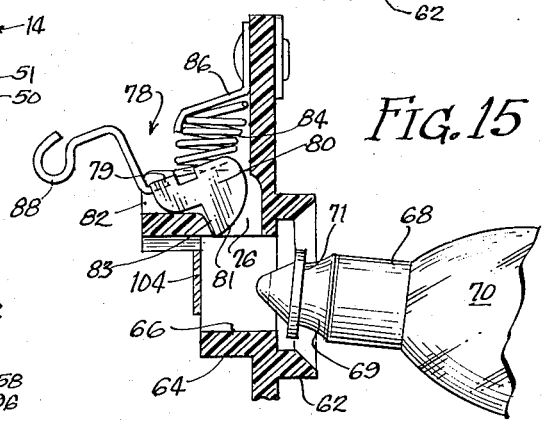
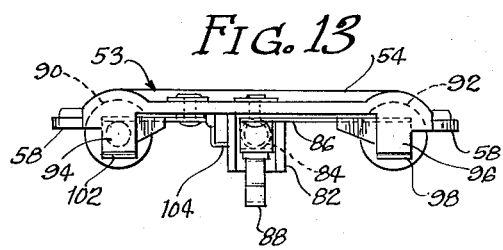
INVENTOR.
George Irwin
BY
Ooms, McDougall, Williams & Hersh
Attorneys United States Patent Office 3,001,461
Patented Sept. 26, 1961

3,001,461
FLASH CAMERA
George Irwin, Highland Park, Ill., assignor to Herbert George Company, Chicago, Ill., a corporation of Illinois
Filed June 30, 1959, Ser. No. 824,014
3 Claims. (Cl. 95—11.5)

This invention relates to a camera with a built-in flash, and it relates more particularly to a flash camera of simple and economical construction.

This application is a continuation-in-part of copending application Serial No. 766,994, filed October 13, 1958. As defined in the copending application, the concept of the invention resides in the combination of the essential elements of a camera with a flash equipment including reflector, bulb and socket and battery supports, all combined into a unitary structure of simple design. Combination of the varied elements into a single, compact unit raises a number of problems which it is the object of this invention to overcome. For example, it is desirable to provide for access to the camera portion for removal and replacement of film without interfering with the flash, and it is equally desirable to have free access to the flash elements for replacement of bulbs or batteries without exposure of the film.

The foregoing can be accomplished by the use of separate subsections for each unit, but further problems arise in the interconnection between units to control the operation of the flash in response to the operation of the camera, and for protection of the flash unit during inoperation of the camera.

Among other things, therefore, one of the important objects of this invention is to provide a camera embodying the above-described desirable features.

Other objects of this invention will become more apparent when read in the light of the accompanying specification and drawings, wherein—

FIGURE 11 is an exploded perspective view of the reflector and its support plate;

FIGURE 12 is a rear view of the housing support plate with the batteries mounted thereon;

FIGURE 13 is a sectional view taken on the line 13—13 of FIGURE 12;

FIGURE 14 is a sectional view taken on the line 14—14 of FIGURE 12; and

FIGURE 15 is a view similar to that shown in FIGURE 14, but with the flash bulb-releasing mechanism shifted to release position.

Figure 1:
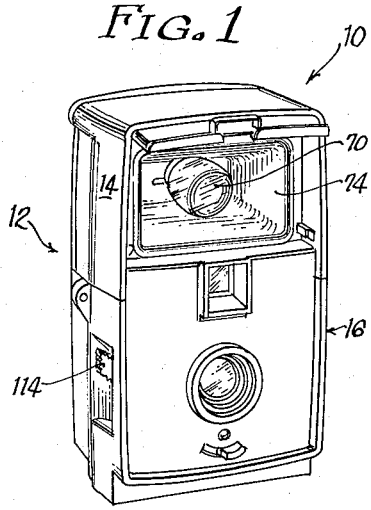
FIGURE 1 is a perspective view of the camera embodying the above-described features.
Figure 2:
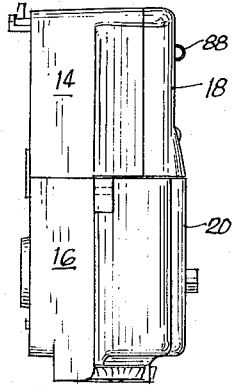
FIGURE 2 is a side elevational view of the camera shown in FIGURE 1.
Figure 3:
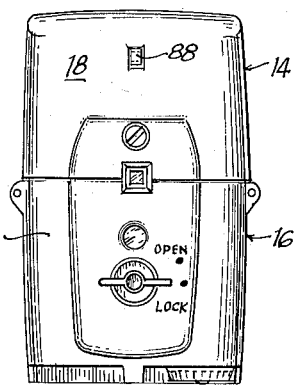
FIGURE 3 is a rear elevational view of the camera shown in FIGURE 1.
Figure 4:
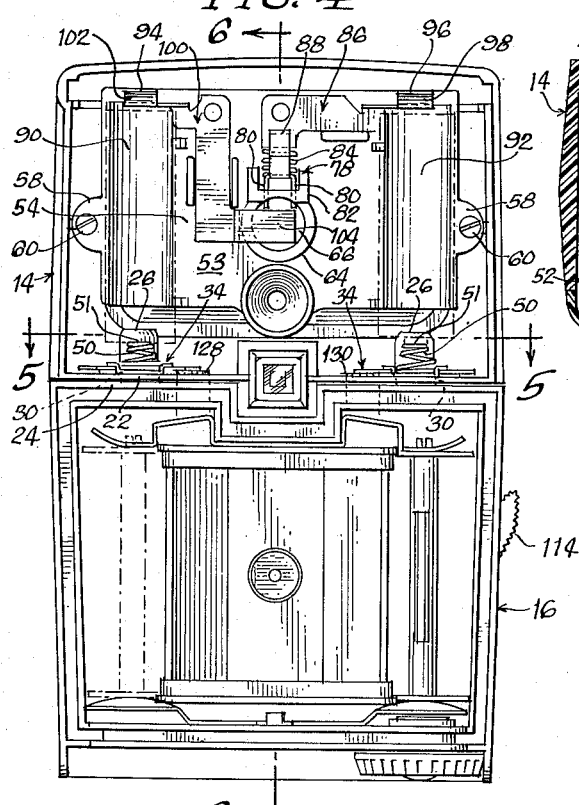
FIGURE 4 is an enlarged rear elevational view of the camera shown in FIGURE 1, but with the closures for both sub-housings removed.
Figure 6:
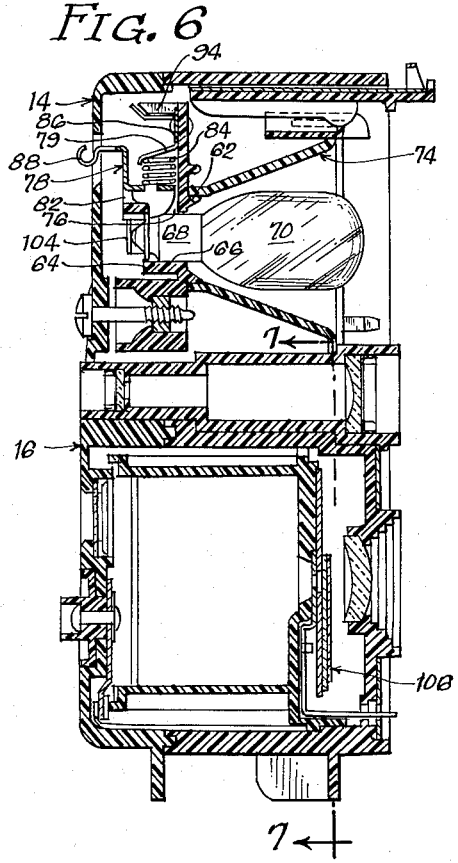
FIGURE 6 is a sectional view taken on the line 6—6 of FIGURE 4.

Referring now to FIGURE 1 of the drawings, the camera indicated generally by the reference numeral 10 comprises a housing 12 formed from sub-housings 14 and 16, see FIGURES 2 and 3. As seen in FIGURES 4 and 6, flash equipment is mounted in sub-housing 14, and the lens and the film-moving mechanism are mounted in sub-housing 16. Sub-housings 14 and 16 are both provided with individual separately removable closures 18 and 20 to permit replacement of the batteries or the film, see FIGURE 3.

As seen in FIGURE 4, the sub-housings are positioned one on top of the other, with the lower, generally planar wall 22 of housing 14 resting on the upper wall 24 of housing 16. Bosses 26 and 28, see FIGURE 5, integrally molded with sub-housing 16 extend upwardly from wall 24 and pass through correspondingly shaped openings 30 and 32 in wall 22 when the sub-housings are positioned one on top of the other, see FIGURE 7. This arrangement precisely positions the sub-housings with respect to each other.

Figure 9:
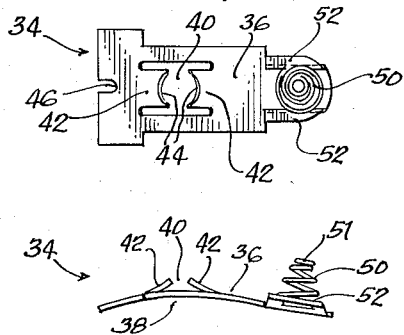
FIGURE 9 is a plan view of one of the electrical connecting clips which hold the sub-housings together.
Figure 10:
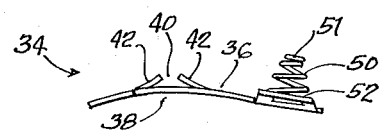
FIGURE 10 is a side view of the connecting clip shown in FIGURE 9.

The sub-housings are locked together by means of electrically conductive quick connect clips, indicated generally by the reference numeral 34. As seen in FIGURES 9 and 10, these clips comprise strips of resilient electrically conductive metal which are arcuate in cross-section. This arrangement defines a convex surface 36 and a concave surface 38.

Each clip 34 is provided with an aperture 40 extending therethrough, and this aperture is designed to receive the portion of one of the bosses 26 which extend through openings 30 in wall 22 of sub-housing 14, see FIGURE 4. Portions 42 of the strips of metal adjacent to and on opposite sides of aperture 40 are deformed outwardly from convex surface 36 and extend toward each other. Arcuate recesses 44 are formed on the adjacent ends of portion 42 for a better contact with the surface of the cylindrical bosses, see FIGURE 9. The separation of the recesses 44 on the adjacent ends of strip portions 42 is slightly less than the thickness of the bosses for reasons to become apparent below.

An indexing slot 46 is formed on one end of the clip. This slot is designed to receive a rib 48 integrally formed on a wall of sub-housing 14, see FIGURE 5. This arrangement prevents the clip 34 from rotating on boss 26. The opposite end of clip 34 is provided with flanges 52 and one end of a coil spring 50, formed from an electrically conductive metal, is mounted in a slit in these flanges. In this way the coil spring 50 is secured to the clip 34 and extends outwardly from its convex surface forming an offset terminal and battery support, as shown in FIGURE 10.

To assemble the sub-housings together, they are first positioned as shown in FIGURES 2 and 3, with bosses 26 and 28 extending through the boss-receiving openings 30 and 32 in the lower wall 22 of the sub-housing 14. Then the clips 34 are inserted over the ends of the portions of bosses 26 extending through openings 30 so that these end portions enter apertures 40 through the concave surface 38. As stated above, the separation of the ends of portions 42 is slightly less than the thickness of bosses 26 so that these ends are deformed and deflected by the entrance of the bosses to an extent sufficient to let the end portions of these bosses pass completely through the aperture 40. The clips 34 are forced down on these bosses until the ribs 48 enter indexing slots 46 and the concave surfaces 38 contact the substantially planar upper surface of wall 22. Pressure on the clip decreases its arcuate curvature until it becomes substantially planar. Then when the pressure is removed, the resilience in the clip produces a reactionary force tending to restore its arcuate shape. This causes the edges of portions 42 to dig into bosses 26, locking the clips in position and securely holding the sub-housings 14 and 16 together.

A support, indicated generally by the reference numeral 53 with opposed surfaces 54 and 56 is, in this particular embodiment, molded from an insulating material, see FIGURES 11 and 12. This support is generally rectangular in shape and mounting ears 58 are integrally formed on each side. These mounting ears are bored to receive bolts 60, see FIGURE 12. Threaded bosses, not shown, are formed in the housing for receiving bolts 60 so that the support 52 may be firmly mounted on the housing.

Cylindrical bosses 62 and 64 integrally molded with support 52 extend out from surfaces 54 and 56, see FIGURES 11, 12 and 14. As seen, these bosses are concentric with each other and have a common bore 66 extending therethrough for receiving the base 68 of a flash bulb, 70, see FIGURES 6 and 14.

Boss 62 is provided with aligning formations, which in this embodiment comprise oppositely extending radial ribs 72. As seen, in FIGURE 11, the boss 62 and the ribs 72 are designed to penetrate a correspondingly shaped opening in the base of reflector 74 to hold the reflector on surface 54 of the support and to prevent the reflector from rotating on boss 62.

Spaced parallel radial grooves 76 extend through boss 64 and communicate with bore 66, see FIGURES 12 and 15. A combination terminal and retaining member 78, comprising a U-shaped member with a web 79 and spaced parallel retaining plates 80, is rockably mounted on a U-shaped support 82 integrally molded on top of boss 64, see FIGURES 4, 12, and 14. As seen in FIGURE 15, retaining plates 80 extend through the grooves 76 into bore 66.

A coil spring 84 is connected at one end to web 79 of the member 78 by any conventional means and at the other end to fixed terminal plate 86, see FIGURE 14. A lever member 88 is also connected to the web 79. With this arrangement the coil spring 84 exerts a force on the web 79 which keeps the plates 80 in grooves 76 until the terminal and retaining member 78 is pivoted by a force exerted on the lever member 88 so that the plates move out of grooves 76, as shown in FIGURE 15.

As seen in FIGURE 14, the lower edge 81 of plates 80 act as a cam, and when the base 68 of flash bulb 70 is forced into bore 66, its movement is obstructed by the portion of plates 80 in this bore, but continued pressure on the flash bulb causes the engagement of the base 68 of the bulb 70 with the cam edge 81 to pivot the plates 80 out of bore 66 so that the base of the flash bulb can completely penetrate bore 66.

The base 68 of the flash bulb 70 used with this camera is provided with a groove 69, see FIGURE 15, and after groove 69 passes by the groove 76 through which the hook-shaped plates 80 enter bore 66, these plates, biased by spring 84 re-enter bore 66 and their edges 83 engage a wall 71 of groove 69, both holding the bulb in the bore, and providing an electrical connection with one terminal of the bulb, see FIGURE 14. When it is desired to release the flash bulb, lever 88 is depressed. This causes the hook-shaped plates to move out of bore 66 through grooves 76, so that the flash bulb 70 is free to fall out of the bore 66, see FIGURE 14.

The support 53, as shown in this particular embodiment, is provided with spaced parallel battery-receiving recesses 90 and 92, integrally formed therewith, see FIGURE 4. As seen, the lower ends of these recesses are disposed just above the upper ends 51 of coil springs 50, mounted on the clips 34, see FIGURE 10, so that when the batteries are positioned in these grooves, the upper ends 51 of the coil springs 50 electrically engage terminals of the batteries and help support and position the batteries in these recesses, see FIGURE 12.

As seen in FIGURES 4, 12, and 13, abutment members or stops 94 and 96 are integrally formed on support 52 at the upper ends of recesses 90 and 92 respectively. An end 98 of a fixed terminal plate 86 engages a surface of stop 96, so that when a battery is positioned in recess 92, one terminal of the battery will engage the end 98 of terminal strip 86, while the other terminal of the battery will rest on the upper end 51 of coil spring 50. With this arrangement, the battery will be firmly but removably held on support 52 in recess 92 between terminals 98 and 51.

An additional terminal strip or member 100 integrally formed from conductive sheet metal is mounted on support 52 as shown in FIGURES 4 and 12. One end 102 of this terminal member is positioned on the surface of stop 94 so that when a battery is positioned in recess 90 one terminal of the battery will engage end 102, while the other terminal of the battery will rest on the upper end 51 of the associated coil spring 50. With this arrangement, the battery will be firmly held in recess 90 between terminals 102 and 51. The opposite end 104 of terminal 100 is positioned over the inner end of bore 66 extending through boss 64 where it is engaged by the center terminal of flash bulb 70. Additionally, end 104 helps position the flash bulb in this bore, see FIGURES 4, 12, and 14.

Figure 7:
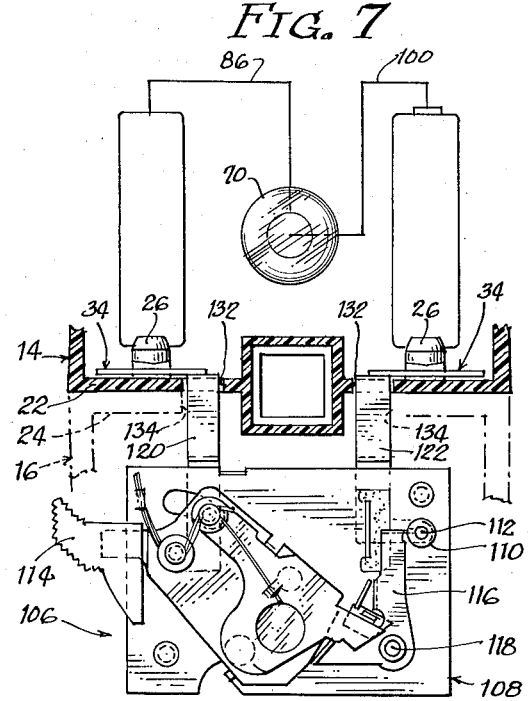
FIGURE 7 is a partial sectional view taken on the line 7—7 of FIGURE 6 with the flash bulb and batteries added.
Figure 8:
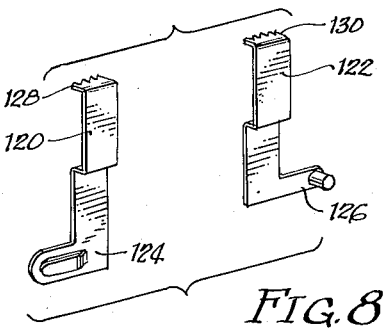
FIGURE 8 is a perspective view of the contacts attached to the shutter mechanism.

The shutter mechanism for the camera, indicated generally by the reference numeral 106, is mounted on a metallic electrically conductive support plate 108, see FIGURE 7. The support plate is provided with a circular opening 110 through which an electric contact 112, insulated from the support plate 106, extends. When actuating lever 114 is depressed, the camera lens opening is momentarily uncovered, and at the same time lever member 116 formed from electrically conductive material, momentarily rotates on pivot 118 and engages contact 112, thereby electrically connecting contacts 112 with support plate 108.

Contact terminal strips 120 and 122 are connected by their lower ends 124 and 126 to the support plate 110 and to contact 112, respectively, by any conventional means, and when actuating lever 114 is depressed, these terminal strips are momentarily electrically connected together. The upper ends of these strips are bent over to form flanges 128 and 130.

Figure 5:
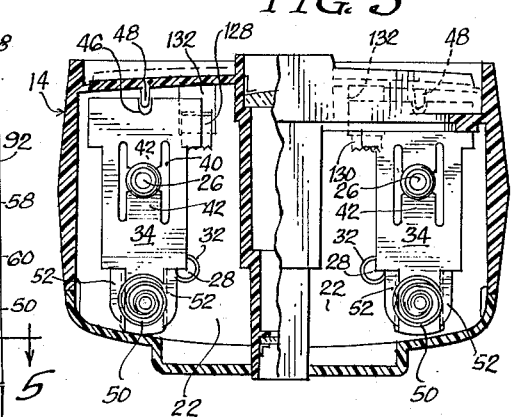
FIGURE 5 is a sectional view taken on the line 5—5 of FIGURE 4.

As seen in FIGURE 7, the terminal strips 120 and 122 are mounted so they extend upward through aligned openings 132 and 134 in the lower wall 22 of housing 14 and the upper wall 24 of housing 16, respectively, with flanges 128 and 130 resting on the inner surface of the lower wall 22 of housing 14, see FIGURES 5 and 7. In this position, when clips 34 are mounted on bosses 26 they engage flanges 128 and 130. As described above, the opposite ends of the clips are connected to batteries through the upper ends 51 of coil springs 50, so that clips 34, in addition to holding the sub-housing together, form a part of the circuit connected between the two sub-housing. Consequently, as seen in FIGURE 7, when lever 114 is depressed, the electric circuit through the flash bulb 70 is completed so the flash bulb operates in synchronization with the camera shutter.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

I claim:

1. A camera housing, said camera housing formed from two sub-housings, one sub-housing having the lens and film-moving mechanism mounted therein and the other sub-housing having the flash equipment mounted therein, a plurality of bosses extending out from one surface of one sub-housing, a surface of the other sub-housing provided with boss-receiving openings for receiving said bosses, said sub-housings positioned so that portions of said bosses extend through said boss-receiving openings, said sub-housings provided with terminal-receiving openings, terminals extending through said terminal-receiving openings into both sub-housings, portions of said terminals in one sub-housing connected to the camera shutter mechanism, portions of said terminals in said other sub-housing adapted to be connected to the flash equipment so that the flash equipment and the camera shutter mechanism may operate simultaneously, and electrically conductive clips for embracing the portions of said bosses extending through said boss-receiving openings to lock said sub-housings together, said terminals positioned so that when said clips embrace said portions of said bosses they also engage said terminals, other portions of said clips adapted to both electrically engage terminals of electric batteries and help support the batteries in their sub-housing.

2. The camera housing described in claim 1 wherein each of said electrically conductive clips comprises a strip of resilient sheet metal arcuate in cross-section and defining thereby a convex surface and a concave surface, said strip having an aperture extending therethrough for receiving a portion of one of said bosses, at least one dimension of said aperture slightly smaller than the diameter of said bosses, portions of said strip adjacent to and on opposite sides of said aperture deformed outwardly from said convex surface and inclined toward each other to define a recess in the concave surface of said strip, said recess communicating with said aperture to facilitate the insertion of said portions of said bosses into said apertures through said concave surface, the curvature of the surface of said sub-housing having the boss-receiving openings smaller than the curvature of said arcuate clip so that if said bosses are forced far enough through said apertures in said clips, the concave surfaces of said clips will engage the said surface of said sub-housing and their curvature will be decreased whereby after the inserting force on said clips is removed the resilience of said sheet metal will cause said portions of said strip adjacent to and on opposite sides of the apertures to dig into and grip said bosses, preventing their removal from the clip and locking the sub-housings together.

3. The clip described in claim 2, including a member secured to one portion thereof, said member adapted to engage a terminal of a battery and help position the battery in its sub-housing.

References Cited in the file of this patent
UNITED STATES PATENTS

| | | |
|---|---|---|
| 2,715,357 | Gebele | Aug. 16, 1955 |
| 2,734,097 | Avery | Feb. 7, 1956 |
| 2,807,990 | Perlin | Oct. 1, 1957 |
| 2,892,009 | Scoville | June 23, 1959 |
| 2,894,302 | Fox | July 14, 1959 |
| 2,908,955 | Brown | Oct. 20, 1959 |